(12) United States Patent
Dupont

(10) Patent No.: US 10,507,371 B2
(45) Date of Patent: Dec. 17, 2019

(54) HANDLE FOR A COGNITIVE TRAINING DEVICE AND COGNITIVE TRAINING DEVICE COMPRISING SAME

(71) Applicant: BC Training, Brain Centered Training, Doncols (LU)

(72) Inventor: Jean-Louis Dupont, Chaudfontaine (BE)

(73) Assignee: BC TRAINING, BRAIN CENTRED TRAINING, Doncols (LU)

( * ) Notice: Subject to any disclaimer, the term of this patent is extended or adjusted under 35 U.S.C. 154(b) by 92 days.

(21) Appl. No.: 15/100,973

(22) PCT Filed: Dec. 2, 2014

(86) PCT No.: PCT/EP2014/076296
§ 371 (c)(1),
(2) Date: Jun. 1, 2016

(87) PCT Pub. No.: WO2015/082492
PCT Pub. Date: Jun. 11, 2015

(65) Prior Publication Data
US 2016/0339318 A1  Nov. 24, 2016

(30) Foreign Application Priority Data
Dec. 3, 2013  (LU) .......................... 92322

(51) Int. Cl.
*A63B 69/00* (2006.01)
*A63B 65/02* (2006.01)
*A63B 43/00* (2006.01)
*F16G 11/10* (2006.01)

(52) U.S. Cl.
CPC ........ *A63B 69/0088* (2013.01); *A63B 43/007* (2013.01); *A63B 69/002* (2013.01); *F16G 11/106* (2013.01); *A63B 2225/09* (2013.01)

(58) Field of Classification Search
CPC .............. A63B 69/0088; A63B 69/002; A63B 2225/09; A63B 43/007; F16G 11/106
USPC .................. 473/424, 423, 422, 425–430
See application file for complete search history.

(56) References Cited

U.S. PATENT DOCUMENTS

| | | | | |
|---|---|---|---|---|
| 678,246 A | * | 7/1901 | Hansel | F16G 11/10 16/DIG. 12 |
| 679,930 A | * | 8/1901 | Webster | F16G 11/10 24/129 R |
| 1,564,382 A | * | 12/1925 | Treiman | F16G 11/048 138/99 |

(Continued)

FOREIGN PATENT DOCUMENTS

| | | |
|---|---|---|
| EP | 02600981 | 3/1988 |
| EP | 0821983 | 2/1998 |

OTHER PUBLICATIONS

Written Opinion and International Search Report, International Application No. PCT/EP2014/076296, filed Dec. 2, 2014.

(Continued)

*Primary Examiner* — Mitra Aryanpour
(74) *Attorney, Agent, or Firm* — Ferguson Case Orr Paterson

(57) ABSTRACT

Cognitive training handle designed to be connected by a longitudinal connecting means to a connection means on a ball, said handle also comprising a means for adjusting the length of said longitudinal connecting means.

8 Claims, 5 Drawing Sheets

(56) References Cited

U.S. PATENT DOCUMENTS

| | | | |
|---|---|---|---|
| 2,945,694 A * | 7/1960 | Heinrich | A63B 69/0088 473/516 |
| 3,168,312 A * | 2/1965 | Davis | A63B 69/0079 473/142 |
| 3,731,925 A * | 5/1973 | Caldwell | A63B 69/0088 473/424 |
| 3,861,003 A * | 1/1975 | Boden | B65D 63/14 24/136 B |
| 3,937,418 A * | 2/1976 | Critelli | A01K 27/004 119/796 |
| 4,023,797 A * | 5/1977 | Sarrasin | A63B 67/20 473/425 |
| 4,391,226 A | 7/1983 | Guthrie | |
| 4,493,134 A * | 1/1985 | Karr | F16G 11/14 174/92 |
| 4,598,911 A * | 7/1986 | Lepera | A63B 69/3632 473/138 |
| 4,753,442 A * | 6/1988 | Bland | A63B 69/0079 473/424 |
| 4,784,389 A * | 11/1988 | Taylor | A63B 67/20 473/425 |
| 5,083,797 A | 1/1992 | Vartija | |
| 5,709,619 A * | 1/1998 | D'Emidio | A63B 69/0088 473/424 |
| 7,048,653 B2 * | 5/2006 | Heimers | A63B 67/20 473/423 |
| 9,084,922 B2 * | 7/2015 | DiMichele, Jr. | A63B 69/0002 473/424 |
| 2006/0014597 A1 * | 1/2006 | Cantu | A63B 69/0002 473/422 |
| 2009/0075763 A1 | 3/2009 | Wu | |
| 2009/0075784 A1 | 3/2009 | Hoggan | |
| 2009/0249586 A1 | 10/2009 | Brown | |
| 2010/0075784 A1 | 3/2010 | Maina | |
| 2014/0228156 A1 * | 8/2014 | Riggle | A63B 69/0088 473/424 |
| 2016/0339318 A1 * | 11/2016 | Dupont | A63B 69/0088 473/424 |

OTHER PUBLICATIONS

Japanese Office Action for Application No. 2016-536127; dated Jun. 26, 2018.

* cited by examiner

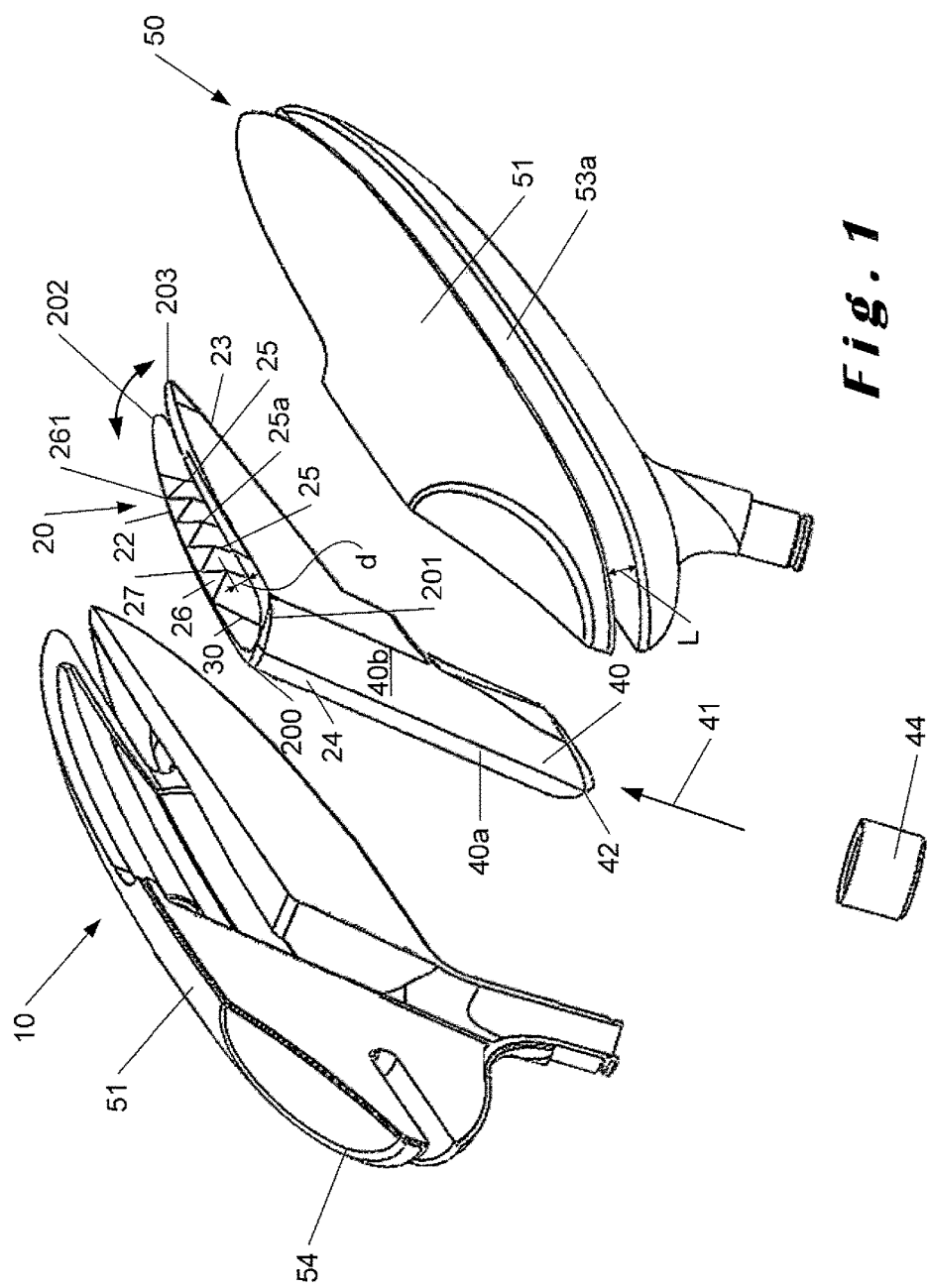

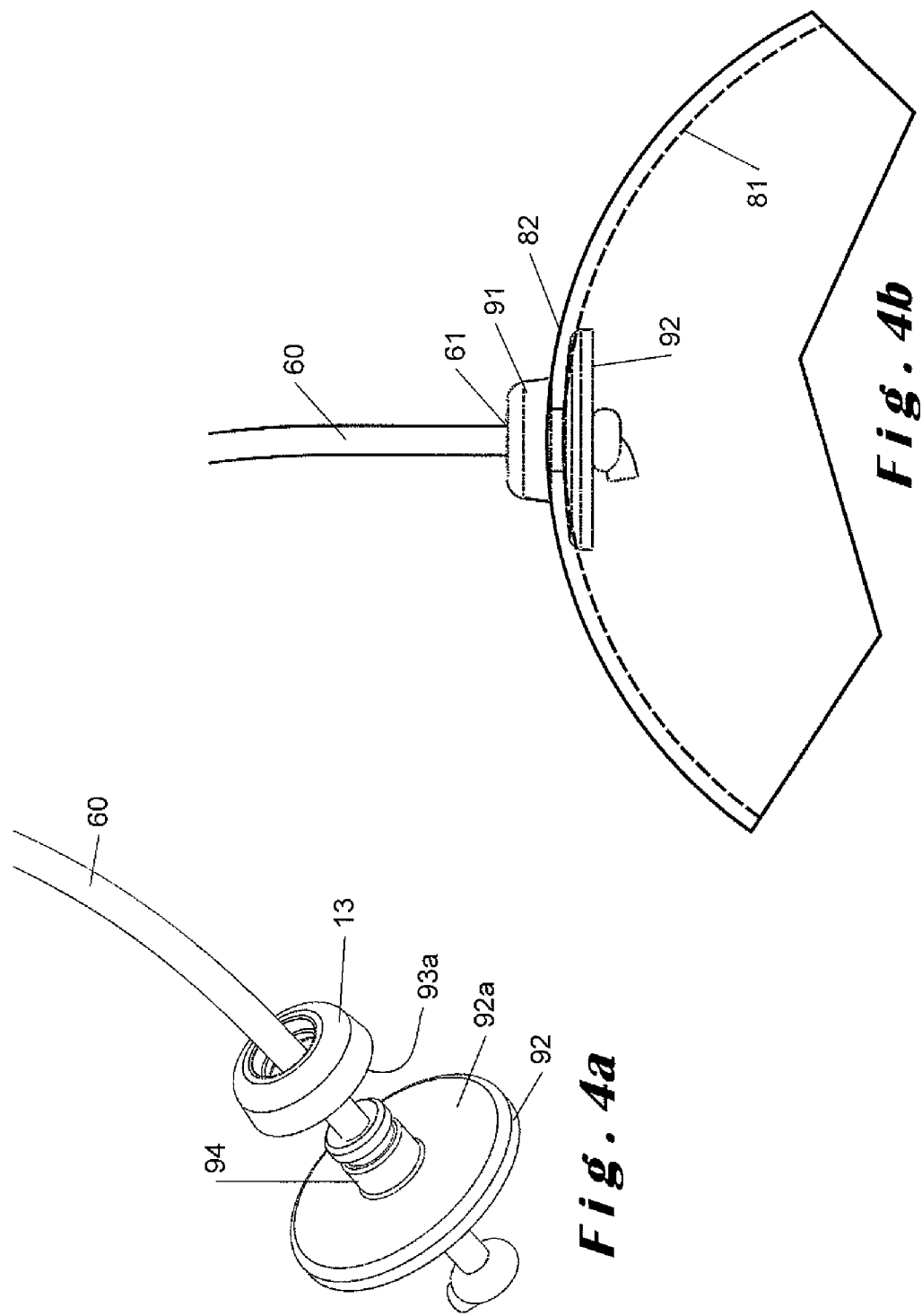

HANDLE FOR A COGNITIVE TRAINING DEVICE AND COGNITIVE TRAINING DEVICE COMPRISING SAME

The present invention relates to a cognitive training handle arranged to be connected by a longitudinal connecting means to a connection means on a ball, said handle further comprising means for adjusting the length of said longitudinal connecting means.

Such a handle is part of a cognitive training device, comprising the connecting means, which is generally a string connecting a ball to said handle. This device is primarily used in the sports field, in particular in soccer, but can also be used for rehabilitation purposes or as a support for psychomotor educational methods. The user can able to be both a professional soccer player who wishes to correct and educate his ball handling and a person having psychomotor deficiencies to be treated, or a person wishing to improve his bodily organization. Such a handle is known from document US 209/075763 and EP 0,821,983.

Taking the example of a soccer-type training method, a user, i.e., a soccer player, grasps said handle in one of his hands and will strike the ball with one of his feet so as to thus improve, his ball handling in different training situations according to a specific training program.

For each user, the length of the string must be adjusted such that, when the bottom of the ball is situated 3 or 4 centimeters from the ground, the handle is situated at the height of the head of the user's femur (at hip level).

The repeated handling using the training device allows the player to specifically assimilate, at the neuronal level, movements of the feet and the rest of the body with which a particular game situation is associated requiring specific ball handling, such that, for each game situation, the player is instinctively able (reflexively, i.e., requiring as short as possible an analysis time for the phase of play) to place his body in an appropriate position in order to provide the best play solution.

Unfortunately, the handles currently existing do not allow easy and precise adaptation of the length of the string. Furthermore, when the movement of the ball has the smallest trajectory fluctuation, the smallest impact on the string is greatly amplified up to the handle and the ball then becomes difficult to control, the user then losing all of the benefit of the training device. He must then control the random movement and restart the specific training program.

The handle according to the present invention is characterized in that said adjusting means comprise at least two side walls, connected to one another by a junction zone, and at least periodically spaced apart from one another by a first dimension at least smaller than a diameter of said longitudinal connecting means to define a retaining region and so as to retain said connecting means when the latter is introduced between the two side walls of said adjusting means.

In this way, a first part of said connecting means is jammed in an adjusted manner by said adjusting means, while a second free part of the connecting means is connected by a first end connected to said connection means of the ball. Thus, the connecting means has a first part connected to the handle via the adjusting means such that it cannot detach from the latter during the use of the training device.

In one particular embodiment, the handle according to the invention is characterized in that it comprises a plurality of retaining regions.

Optionally, the two side walls are connected to one another by said junction zone, which further defines an entry path toward said at least one retaining region for said connecting means.

Alternatively, the side walls are at least periodically spaced apart from one another by a second dimension at least larger than said diameter of said longitudinal connecting means to define a passage region for said connecting means.

In this way, the player who wishes to use the handle introduces the string (i.e., the connecting means) between the two side walls through the passage region, through which it can enter freely, adjusts the length of the string to a desired value as a function of the exercise, and next pinches the string in the retaining region where the side walls are spaced apart by a distance smaller than the diameter of the string. If the user wishes to increase or decrease the length of the string defined by the distance separating the ball from the handle, he must then simply remove the string from the retaining region to pass it in said passage region.

The presence of the entry path on the junction zone makes it possible to orient the connecting means toward the retaining region of the adjusting means and to facilitate the placement of the connecting means in that region.

Preferably, the handle also comprises an outer case, defined in at least two case parts, the case being arranged to at least partially house said adjusting means and, when said at least two case parts are connected to one another, has an outlet orifice for the connecting means.

The presence of the outlet orifice of the case makes it possible to orient a third free part, opposite the second free part connected to the ball, of said connecting means outside the retaining region of the adjusting means. This third free part procures a gripping means for the connecting means that a user may press to remove and place said connecting means at his leisure in and outside the retaining region of the adjusting means during the adjustment of the length of said connecting means.

Advantageously, at least one case part forms an open cavity of a groove, said cavity being arranged to receive said connecting means in an adjusted manner.

In this way, the third free part can be temporarily housed in the groove of the handle and allow more comfortable gripping of the handle by a user.

In one particularly advantageous embodiment of the present invention, the handle further comprises a guide means arranged to guide said connecting means in a guide direction, said guide means extending from said adjusting means by an angle comprised between 90 degrees and 150 degrees, preferably between 110 degrees and 140 degrees means a guide. In particular, the guide means can comprise a guide wall, or a tube, or a groove.

The presence of the guide means makes it possible to guide the connecting means in a guiding direction toward said retaining region of said adjusting means such that the movement of the connecting means in said adjusting means is facilitated, in particular when the ball is heavy, the adjustment of the length to a desired length being done via said adjusting means of the handle.

Other embodiments of the handle according to the invention are indicated in the appended claims.

The present invention also relates to a cognitive training device comprising:
a handle according to the invention;
a ball comprising a connection means;

a connecting means arranged to connect or connecting the handle to said connection means of said ball.

Preferably, said connecting means is a cable, or chain, or string.

In particular, said connection means of the ball comprises:
an orifice crossing through a ball wall;
a first connection part placed inside said ball; and
a second connection part placed outside said ball,
said first connection part having a front face from which a first male connecting element protrudes, said first male connecting element crossing through said orifice and being fitted in a second female connecting element procured by the second connection part and arranged to be connected to said connecting means, said front face of said first connecting element being in contact with an inner wall part of the ball and a dorsal face of said second connecting element being arranged to be in contact with an outer wall part of the ball, so as to form a hermetic connection between said ball and said connecting means.

Other embodiments of the device according to the invention are indicated in the appended claims.

Other features, details and advantages of the invention will emerge from the following description, provided non-limitingly and in reference to the appended drawings.

FIG. 1 is an exploded perspective view of one preferred embodiment of the handle according to the invention.

FIGS. 4a and 4b illustrate a first perspective view and a second profile view of the connection means of the ball.

In the figures, identical or similar elements bear the same references.

Figure 2B:
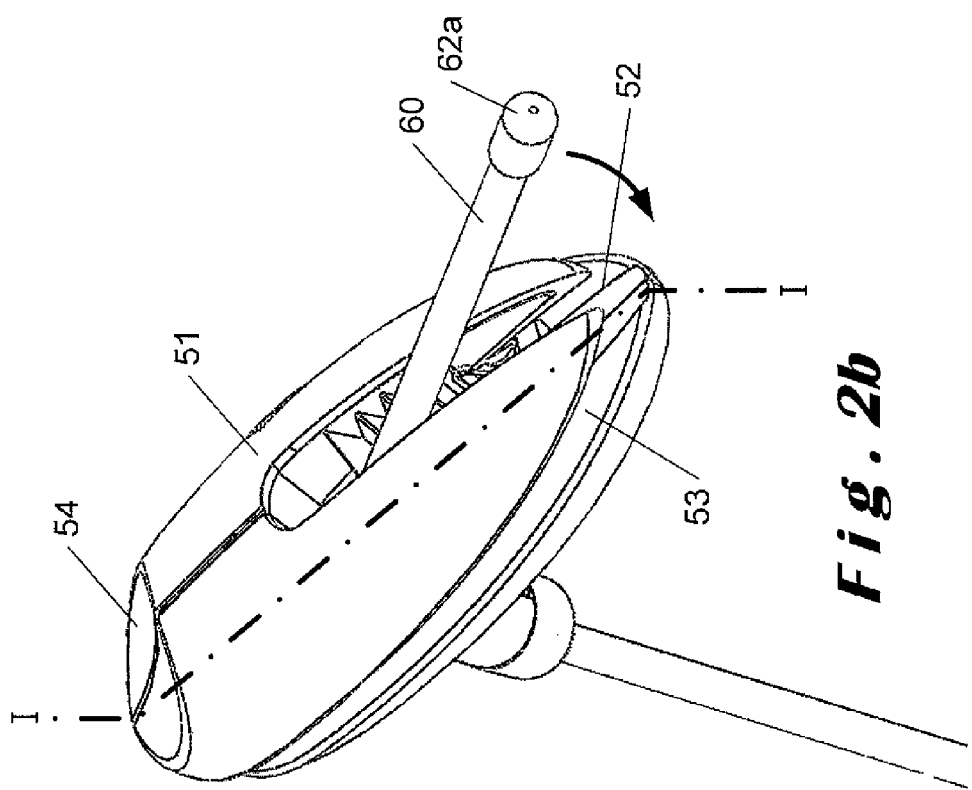
FIGS. 2a to 2c are other perspective views of one preferred embodiment illustrated in FIG. 1.

FIG. 1 is an exploded perspective view of one preferred embodiment of the handle 10 according to the invention comprising an adjusting means 20 for adjusting the length of the longitudinal connecting means, the latter being arranged to connect a ball to the handle 10.

The adjusting means comprises two side walls 22, 23, which form a clamp 21, the walls being connected to one another by a junction zone 24. In particular, each side wall comprises a first connected end 200, 201 and a second free end 202, 203, each connected end of each side wall 22, 23 being connected to one another by said junction means 24, the connected ends 200, 201 further defining an inlet path 30 for connecting means 60 toward a retaining region 25 situated between said side walls 22, 23 and wherein the connecting means is retained in the adjusting means 20. Furthermore, the free ends of the adjusting means define an outlet path 31 of the connecting means 60.

The walls 22, 23 are at least periodically spaced apart from one another by a distance d, the longitudinal connecting means 60 having a cross-section characterized by a diameter or a section width at least equal to the distance d separating each wall, so as to retain the connecting means when the latter is inserted in the retaining region 25 defined by a periodic spacing with the width d between the two side walls 22, 23 of the adjusting means 20.

In the embodiment of the handle as illustrated in FIG. 1, at least one wall 22, 23 comprises a plurality of retaining regions. In particular, each side wall has an inner surface arranged to be in contact with an outer surface of said connecting means when it is retained in at least one of the preceding regions 25.

Preferably, the inner surfaces of each wall face one another. In particular, at least one inner surface comprises at least one peak 26 and optionally at least one hollow 27. In the embodiment of FIG. 1, at least one inner surface of the side wall comprises at least one peak and optionally one hollow, or a plurality of alternating peaks and hollows, the adjusting means 20 then having a plurality of retaining regions 25 formed between each peak end 261 of the first side wall 22 and the inner surface of a second side wall 23 opposite the first side wall, and at least one passage region formed between each hollow 27 of a first side wall 22 and the inner surface or a hollow of a second side wall 23 opposite the first side wall separated by a distance d' at least larger than the diameter of the connecting means 60. In this particular embodiment, the adjusting means then comprises a series of alternating retaining regions and passage regions 25a, defined between the side walls 22, 23.

Furthermore, each retaining region can also be formed between two peaks of each wall, or between a peak of one wall and the hollow of another wall, opposite it.

In particular, each side wall is arranged to move between a first retaining position corresponding to a first state in which, when the connecting means 60 is housed in at least one retaining region, each inner surface of each side wall is gripped on the outer surface of the connecting means 60, the second free position corresponding to a second state in which said second connecting means is free to move between the side walls, for example in the passage region 25a.

When a first part of said connecting means is jammed in an adjusted manner in the retaining region 25 of said adjusting means 20, a second free part of the connecting means is connected by a first end connected to said connection means of the ball. Thus, the connecting means has a first retaining part sufficiently gripped to the adjusting means for it not to be able to detach from the latter during the use of the training device and the joint setting in motion of the ball and the second free part of the connecting means connecting the ball to the handle.

The junction zone 24 of the connected ends of each wall 22, 23 of the adjusting means is arranged to generate an elastic force acting on each wall so as to generate, on the inner surface of each wall, a pressure force oriented from each side wall toward the retaining region and arranged to grip the inner surface of the walls on the outer surface of the connecting means in the retaining region 25.

In this context, the junction zone has a curve radius such that it makes it possible to generate an elastic force with a sufficient intensity to ensure the retaining of the connecting means in the retaining region of the adjusting means.

Preferably, the junction zone and the side walls of the adjusting means are made from a plastic material.

In this way, the inner surface of each wall, in the retaining region, exerts a first pressure force acting on the outer surface of the connecting means, and in reaction to the pressure force applied on the connecting means, each side wall undergoes a second reaction force with the same direction but opposite sense, exerted by the connecting means.

In this context, the connecting means is maintained in the retaining region by the balance of the pressure and reaction forces generated between the connecting means and each inner surface of each side wall.

Optionally, the adjusting means 20 is an assembly of at least two independent parts arranged to be connected to one another, preferably removably. For example, a first independent part of the adjusting means can be the first side wall, while a second independent part of the adjusting means can be the second side wall, each side wall being arranged to be connected to one another by a junction means defining the junction zone 24 that procures a third part of the adjusting means.

As illustrated in FIG. 1, the handle further comprises a guide means 40 arranged to guide the connecting means 60 in a guide direction 41, the guide means extending from the adjusting means by an angle α comprised between 90 degrees and 150 degrees, preferably between 110 degrees and 140 degrees.

In particular, the guide means 40 is a tube in which the connecting means is arranged to be inserted such that at least part of an inner surface of the tube is arranged to be in contact with the outer surface of the connecting means when the connecting means move along the guide direction 41.

The tube has a first inlet orifice 42 for the connecting means and a second outlet orifice 43 for the connecting means, the second outlet orifice preferably coinciding with the inlet path 30 of the connecting means 60, which provides access to the retaining region 25 situated between said side walls.

This tube is further oriented such that the guiding direction is a vector secant to a median horizontal plane at the side walls 22, 23, the direction forming, with the median plane, an angle α comprised between 90 degrees and 150 degrees, preferably between 110 degrees and 140 degrees, so as to improve the ergonomics of the handle.

Preferably, the guide means is an assembly of at least two guide means parts arranged to be connected to one another, preferably removably.

In particular, as shown by FIG. 1, the tube 40 comprises a first tube part 40a and a second tube part 40b, each of the tube parts being connected to a side wall 22, 23. Once the tube parts are connected to one another, for example by a junction line by welding, they form the guide means, which is extended by the pair of side walls 22, 23 of the adjusting means 20. Preferably, a ring 44 can be fitted on the tube so as to reinforce the junction line between the parts of the guide means 40a, 40b.

Figure 2A:
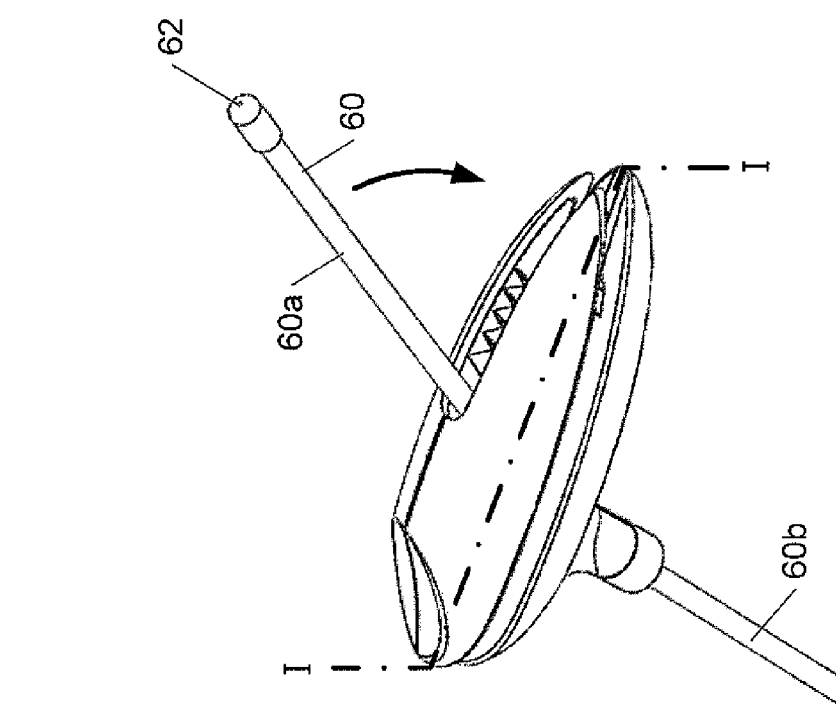

As illustrated in FIGS. 2a and 2b, the handle further comprises an outer case 50 in which the adjusting means 20 and/or said guide means 40 are at least partially housed, the case having an enclosure 51 crossed through by an outlet orifice 52 of the connecting means 60 placed so as to coincide with the outlet paths 31 of the connecting means 60, the enclosure 51 having a cavity opened by a peripheral groove 53 having an inner wall 53a defining the wall of the open cavity, the cavity being arranged to receive the connecting means, which can for example be a string, in an adjusted manner.

Alternatively, the end 62 of the connecting means 60 is connected to an end-piece made from a flexible material (for example, from rubber) 62a, with a diameter at least equal to, preferably greater than, the width L of the groove 53. In this way, due to the elasticity of the end-piece, the latter can be housed in an adjusted manner, by simple pressure (FIG. 2c), in the open cavity of the groove 53, and be removed therefrom by simple pulling. Thus, the adjusted maintenance of the connecting means 60 in the peripheral groove cavity 53 is ensured because an elastic force is generated by the material of the end-piece, in reaction to the pressure applied on said end-piece, and acts on the inner wall of the groove cavity 53, the end-piece and therefore the connecting means then being maintained by the equilibrium of the pressure and reaction forces.

Optionally, the case comprises at least two case parts arranged to be connected to one another, preferably removably, and when said at least two case parts are connected to one another, the case has an outlet orifice 52 of the connecting means that communicates with the outlet paths 31 of the connecting means 60.

Preferably, the case further comprises a recess 54 to house a thumb of the user.

Figure 3:
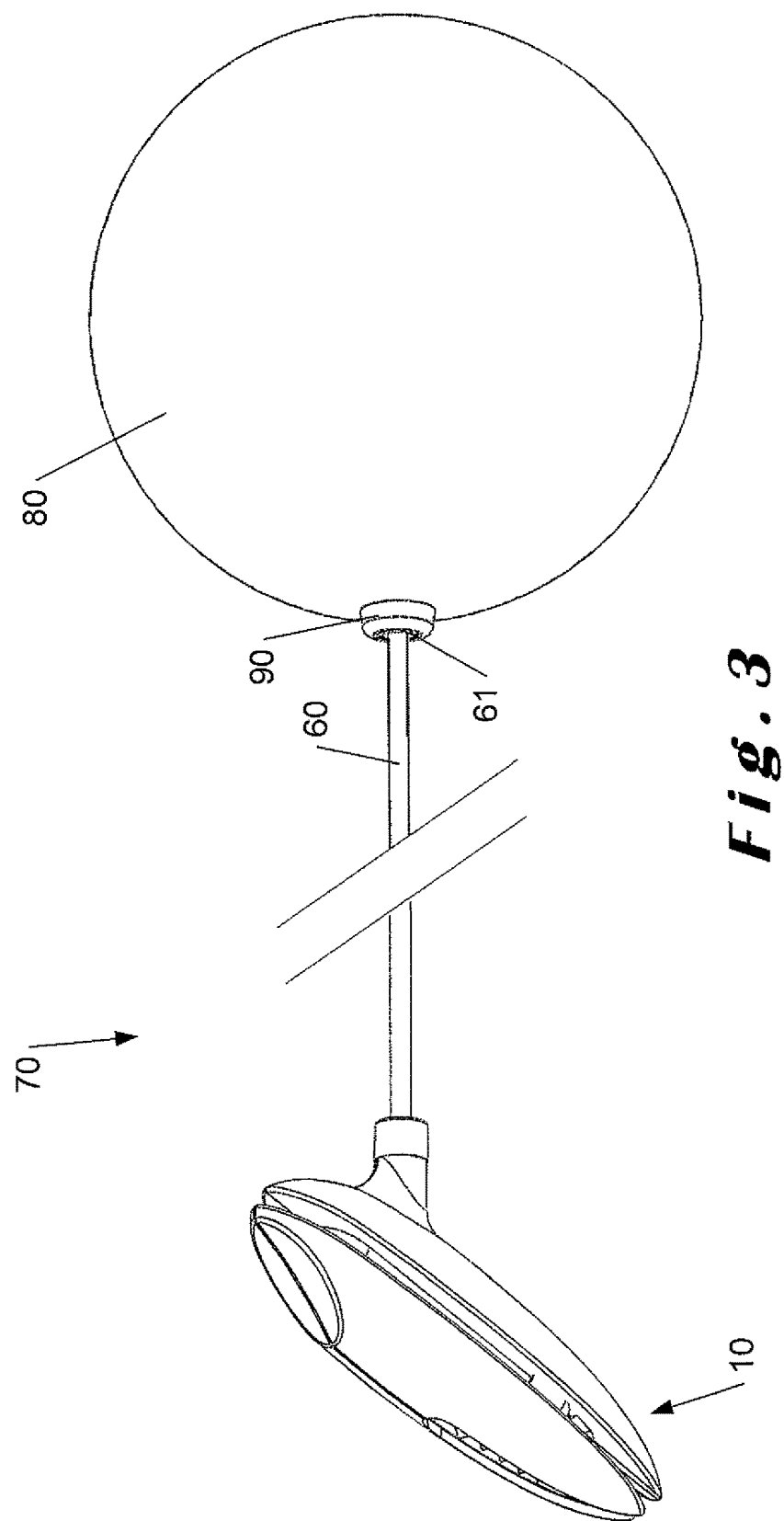
FIG. 3 is a perspective view of the device according to the invention.

FIG. 3 is a perspective view of one particular embodiment of the device 70 according to the invention, comprising:
  the handle 10;
  a ball 80 comprising a connection means 90;
  the connecting means 60 arranged to connect the handle to the connection means 90 of the ball 80.

Preferably, the connecting means connects the handle to the connection means of the ball.

In particular, the connection means 90 of the ball 80 comprises:
  an orifice 91 crossing through a wall of the ball 80;
  a first connection part 92 placed inside the ball (FIGS. 4a and 4b); and
  a second connection part 92 placed outside the ball.

The first connection part 92 has a front face 92a from which a first male connecting element 94 protrudes. This first male connecting element 94 is arranged to cross through the orifice 91 of the ball wall 80. It is further arranged to fit in a second female connecting element 93 procured by the second connection part and arranged to be connected to the first connected end 61 of the string 60, the front face 92a of the first connection means 92 being arranged to be in contact with an inner wall part 81 of the ball and a dorsal face 93a of the second connecting element 93 arranged to be in contact with an outer wall part 82 of the ball, so as to form a hermetic connection between the ball wall 80 and the string.

Figure 2D:
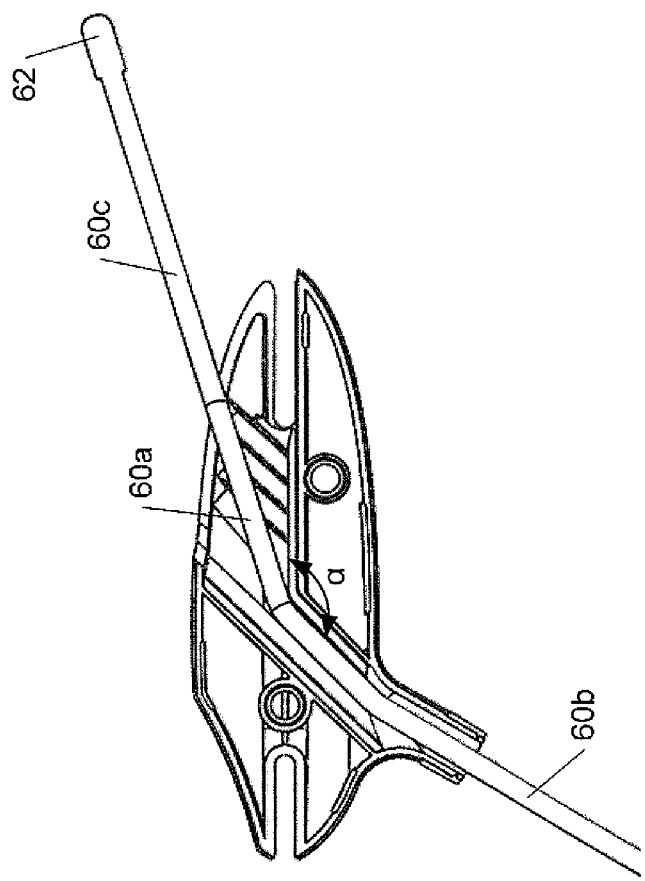
FIG. 2d is a longitudinal sectional view I-I of the handle of FIGS. 2a to 2c.
Figure 2C:
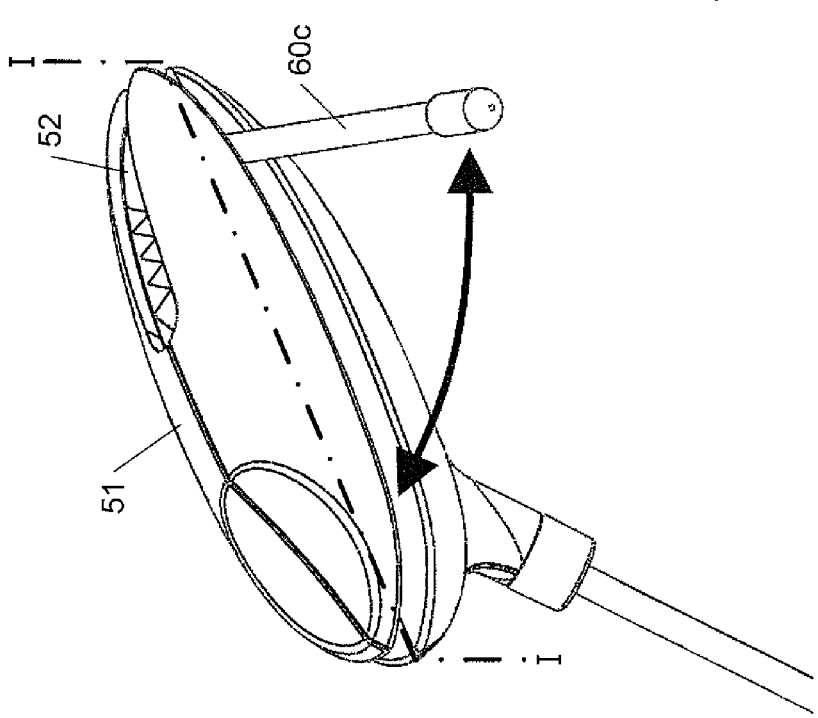

During use of the device according to the invention, as illustrated in FIGS. 2a to 2c, the operation of the latter follows the steps below:
  the user first grasps the handle 10 with a first hand, and with the other hand, he grasps a part of the string 60 or a free end 62 of the string;
  The string 60 is next made to penetrate, by its free end 62, in the guide tube 40, crosses through the latter, and next crosses through the inlet path 31 of the guide means to penetrate the passage region 25a of the adjusting means. In this configuration, the string 60 has a first part 60a situated in the passage region, for example between two hollows 27 each situated on each side wall, and is arranged to be housed in at least one retaining region 25 of the adjusting means 20, for example between two peaks 26, and a second free part 60b arranged to connect the handle 10 to the ball 80;
  The user next place of the first part 60a of the string 60 between the two side walls 22, 23 of the adjusting means 20 by exerting a pushing force on this first string part toward the retaining region 25 (FIGS. 2a and 2b), through the outlet path 31 of the adjusting means 20 and the outlet orifice 52 of the case, such that the first string part 60a is then retained in an adjusted manner in the adjusting means. Based on the desired adjustment of the length of the second free part 60b of the string, the string will or will not have a third free string part 60c, opposite the second free string part 60b (FIG. 2d). In this context, the length of the third free part 60c of the string 60 depends on the distance separating the inlet path 30 and the outlet path 31 of the adjusting means 20, and the length of the string 60;
  The user can lastly temporarily house the potential third free string part 60c removably in the groove of the handle and thus make the gripping of the latter more comfortable (FIG. 2c). It should be noted that this third free string part 60c procures a gripping means of the connecting means 60 that the user can then grasp to remove and place the string 60, at his leisure, in and outside the retaining region 25 of the adjusting means 20 during the adjustment of the length of the second free part 60a of the string 60.

The user may repeatedly, by simple pulling in a direction opposite that of the pushing force on the gripping means or on the free end 62 of the string, remove the first part 60a of the string from the retaining region 25 toward the adjacent passage region, and, by pulling on the string or allowing it to move under the effect of the weight of the ball, along the guiding direction 41, once again adjust the length of the second free part to next house the string in the adjusting means again.

It is clearly understood that the present invention is in no way limited to the embodiments described above, and that changes may be made thereto without going beyond the scope of the appended claims.

The invention claimed is:

1. A cognitive training handle arranged to be connected by a longitudinal connecting means to a connection means on a ball, said handle further comprising adjusting means for adjusting the length of said longitudinal connecting means, said handle being characterized in that said adjusting means comprises:
   two side walls,
   a series of alternating retaining regions and passage regions between the two side walls,
   wherein the two side walls are connected to one another by a junction zone,
   wherein the retaining regions are regions where the two side walls are spaced apart from one another by a first dimension d at least smaller than a diameter of said longitudinal connecting means so as to jam said connecting means when the latter is introduced between the two side walls of said adjusting means, and
   wherein the passage regions are regions where the two side walls are spaced apart from one another by a second dimension d at least larger than said diameter of said longitudinal connecting means,
   the handle comprising an outer case, defined in at least two case parts, the case being arranged to at least partially house said adjusting means and, when said at least two case parts are connected to one another, has an outlet orifice for the connecting means,
   wherein the outer case comprises a groove extending over a complete periphery of the outer case, said outlet orifice for the connecting means directly opening onto said groove and said groove presenting a depth of groove and a width of groove at least larger than said diameter of said longitudinal connecting means to receive a free part of said connecting means in an adjusted manner.

2. The handle according to claim 1, characterized in that said junction zone defines an entry path toward said retaining regions for said connecting means.

3. The handle according to claim 1, characterized in that said handle further comprises a guide means arranged to guide said connecting means in a guide direction, said guide means extending from said adjusting means by an angle α ranging between 90 degrees and 150 degrees.

4. The handle according to claim 3, characterized in that the guide means comprise a guide wall, or a tube, or a groove.

5. The device according to claim 1, characterized in that said connection means of the ball comprises:
   an orifice crossing through a ball wall;
   a first connection part placed inside said ball; and
   a second connection part placed outside said ball, said first connection part having a front face from which a first male connecting element protrudes, said first male connecting element crossing through said orifice and being fitted in a second female connecting element procured by the second connection part and arranged to be connected to said connecting means, said front face of said first connecting element being in contact with an inner wall part of the ball and a dorsal face of said second connecting element being arranged to be in contact with an outer wall part of the ball, so as to form a hermetic connection between said ball and said connecting means.

6. The device according to claim 1, characterized in that said connecting means is a cable, or chain, or string.

7. The device according to claim 1,
   wherein the two side walls have inner surfaces facing one another,
   wherein a first of these inner surfaces comprises a plurality of alternating peaks and hollows, and
   wherein the retaining regions are formed between each peak end of the first of these inner surfaces and a second of these inner surfaces.

8. The device according to claim 7, wherein the passage regions are formed between hollow of the first of these inner surfaces and the second of these inner surfaces.

* * * * *